United States Patent [19]
Sibigtroth et al.

[11] Patent Number: 5,475,822
[45] Date of Patent: Dec. 12, 1995

[54] DATA PROCESSING SYSTEM FOR RESUMING INSTRUCTION EXECUTION AFTER AN INTERRUPT AND METHOD THEREFOR

[75] Inventors: James M. Sibigtroth, Round Rock; J. Greg Viot; Marlan L. Winter, both of Austin, all of Tex.

[73] Assignee: Motorola, Inc., Schaumburg, Ill.

[21] Appl. No.: 151,635

[22] Filed: Nov. 15, 1993

[51] Int. Cl.$^6$ .............................. G06F 9/445; G06F 9/46
[52] U.S. Cl. ...................... 395/375; 364/DIG. 1; 364/263.2; 364/259.9; 364/285.1; 364/285.2
[58] Field of Search ............................ 395/375, 800

[56] References Cited

U.S. PATENT DOCUMENTS

| | | | |
|---|---|---|---|
| 4,344,133 | 8/1982 | Bruce, Jr. et al. | 395/775 |
| 4,409,653 | 10/1983 | Bruce, Jr. | 395/725 |
| 4,709,324 | 11/1987 | Kloker | 395/725 |
| 4,970,641 | 11/1990 | Hester et al. | 395/400 |
| 5,125,087 | 6/1992 | Randell | 395/425 |
| 5,197,138 | 3/1993 | Hobbs et al. | 395/375 |
| 5,247,628 | 9/1993 | Grohoski | 395/375 |
| 5,287,523 | 2/1994 | Allison et al. | 395/725 |
| 5,297,282 | 3/1994 | Meilak et al. | 395/700 |

FOREIGN PATENT DOCUMENTS

| | | |
|---|---|---|
| 2187829 | 7/1990 | Japan . |
| WO84/02407 | 6/1984 | WIPO . |
| WO93/11482 | 6/1993 | WIPO . |

OTHER PUBLICATIONS

"Virtual Memory and the MC68010" by D. MacGregor et al. of Motorola, Inc., and published in vol. 3, No. 3 IEEE Micro, Jun. 1983, pp. 24–39.

Motorola, Inc., "MC6809–MC6809E 8–Bit Microprocessor Programming Manual," Mar. 1, 1981, pp. 1–3 through 1–6; A–59.

Motorola, Inc., "M68HC16 Family CPU16 Central Procesor Unit Reference Manual," 1991, pp. 6–179 through 6–180; 11–9.

Motorola, Inc., "MC68040 32–Bit Microprocessor User's Manual," 1989, pp. 8–39 through 8–45; 9–20 through 9–30.

Motorola, Inc., "DSP56000/DSP56001 Digital Signal Processor User's Manual," Appendix A–Instruction Set Details, pp. A–185 through A–189.

*Primary Examiner*—Krisna Lim
*Attorney, Agent, or Firm*—Elizabeth A. Apperley

[57] ABSTRACT

The data processing system(10) implements a resumable instruction using two instruction bytes. When a program counter (72) points to a first instruction byte, a first data processing operation is initiated. If an interrupt occurs during execution of the first data processing operation, intermediate data calculations held in a plurality of temporary registers (64, 66, 68) are saved in stack memory at a location pointed to by the stack pointer register (72). The program counter is incremented to point to a second byte of the instruction. An instruction resume operation is executed and the intermediate results of the data processing operation are accessed from the stack memory and restored to respective storage locations within the data processing system. After the intermediate results are restored, the program counter is decremented to point to the first instruction byte and the instruction continues executing the data processing operation as though no interrupt occurred.

20 Claims, 3 Drawing Sheets

DATA PROCESSING SYSTEM FOR RESUMING INSTRUCTION EXECUTION AFTER AN INTERRUPT AND METHOD THEREFOR

FIELD OF THE INVENTION

This invention relates generally to an instruction in a data processing system, and more particularly to a resumable instruction in a data processing system.

BACKGROUND OF THE INVENTION

As the complexity of data processing systems increases, some instructions executed by the data processing systems require more instruction cycles to be fully executed. Increasing instruction cycles correspond to longer execution times and, consequently, the need for signals to interrupt execution of the function. The interrupting signals generally indicate that more urgent data processing functions should be performed. In current instructions which have a high latency, one of two methods is generally implemented when an interrupt is asserted before an instruction is fully executed.

In a first method, the data processing system ignores the interrupt until after the instruction is fully executed. After the instruction is executed, the interrupt is then processed. In data processing instructions, such as divide, multiply and accumulate, and complex fuzzy logic instructions, the time expended before handling the interrupt may be critical to the proper operation of the data processing system. In other systems in which the timing of the interrupt is not critical, the efficiency of the system may be decreased by the long execution time of the instruction currently being executed.

In a second method, the data processing system simply stops execution of the instruction when the interrupt is received. The data necessary for execution of the instruction is typically stored in a stack memory, or other memory device, in the data processing system and the interrupt is then processed immediately. After processing the interrupt, the data processing system then retrieves the data stored on the stack memory, or other memory device, and resumes execution of the instruction from the beginning. Previously calculated intermediate results are retrieved and again used during subsequent execution of the same instruction. In data processing systems which implement this second method of processing interrupts, initialization for execution of the instruction must be performed in a series of additional instructions. If the initialization steps were performed during execution of the instruction, then all initialization steps would be repeated each time the instruction was interrupted. Again, the efficiency of the data processing system is not optimized. The required inclusion of initialization steps prior to instruction execution uses valuable memory space, without increasing the functionality of the system which implements the second method for processing interrupts.

A need has developed for a data processing system which allows interrupts to be effectively processed while maintaining the optimum performance of the system. Currently, prior art implementations simply ignore the interrupt, regardless of urgency and priority, until after instruction execution, or interrupt instruction execution and immediately process the interrupt, losing all intermediate instruction calculation. In general, the prior art techniques described above do not provide for optimum performance of the data processing system in which they are implemented.

SUMMARY OF THE INVENTION

The previously mentioned needs are fulfilled with the present invention. Accordingly, there is provided, in a first form, a data processing system. The data processing system includes an interface circuit for receiving a resumable instruction. The resumable instruction has a first instruction byte and a second instruction byte. The data processing system also includes an instruction decode circuit for decoding the resumable instruction to provide a plurality of control values. The instruction decode circuit is connected to the interface circuit for receiving the resumable instruction. A program counter stores a program counter value pointing to the resumable instruction. The program counter selectively points to one of the first instruction byte and the second instruction byte of the resumable instruction. A register circuit stores a plurality of initialization values and a plurality of intermediate values calculated when the program counter value points to the first instruction byte of the resumable instruction. An arithmetic logic unit is connected to the register circuit for receiving the plurality of initialization values and the plurality of intermediate values. The arithmetic logic unit selectively uses the plurality of initialization values and the plurality of intermediate values to calculate a result of the resumable instruction in response to the plurality of control values. A stack memory stores the plurality of intermediate values stored in the register circuit when an interrupt signal is asserted and the program counter value points to the first instruction byte of the resumable instruction. The stack memory provides the plurality of intermediate values to the register circuit when the program counter value points to the second instruction byte of the resumable instruction.

Additionally, there is provided, in a second form, a method for executing a resumable instruction in a data processor. The method includes a step of receiving a resumable instruction having a first instruction byte and a second instruction byte. A program counter is enabled to point to one of the first instruction byte and the second instruction byte. A first data processing function is executed when the program counter points to the first instruction byte. A second data processing function is executed when the program counter points to the second instruction byte, wherein the second data processing function enables the data processor to resume execution of the first data processing function.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

The present invention provides a data processing system which implements an instruction which may be temporarily interrupted and then resumed at a later point in time. Intermediate results, calculated before the interruption of the instruction, are stored in stack memory, a program counter value indicating an address of the instruction is incremented, and the interrupt is processed in accordance with a previously defined program.

The program counter is incremented by one to access a second byte of the instruction. Subsequently, the data processing system executes an interrupt routine. After executing the interrupt routine, the incremented program counter points to the second instruction byte of the instruction to resume instruction execution. When the second byte of the instruction is accessed, a resume portion of the instruction is executed in which the intermediate results of the data processing operation are accessed from the stack memory and restored to their respective storage locations within the data processing system. As well, the program counter is decremented by one such that it points to the first byte of the instruction. After the intermediate results are restored, the instruction continues executing the data processing operation as though no interrupt occurred.

The data processing system described herein allows a user of the processing system to interrupt an instruction, execute an interrupt routine, and then to complete execution of the instruction with no lost cycle time. Unlike prior art implementations, the user is not required to wait until the instruction is fully executed to execute the interrupt routine in response to an interrupt signal. As well, the user does not lose intermediate results The system described herein effectively allows an instruction to be interrupted while maintaining optimum performance and efficient operation. Correct operation of the data processing system is maintained by immediately processing an interrupt signal. Furthermore, intermediate results generated during execution of the instruction are stored in the stack memory, such that processing time is not spent in determining previously calculated values. The embodiment of the invention and the circuitry which allow for the optimized execution of an instruction having a long execution time will be subsequently described in more detail.

Description of Connectivity

Figure 1:
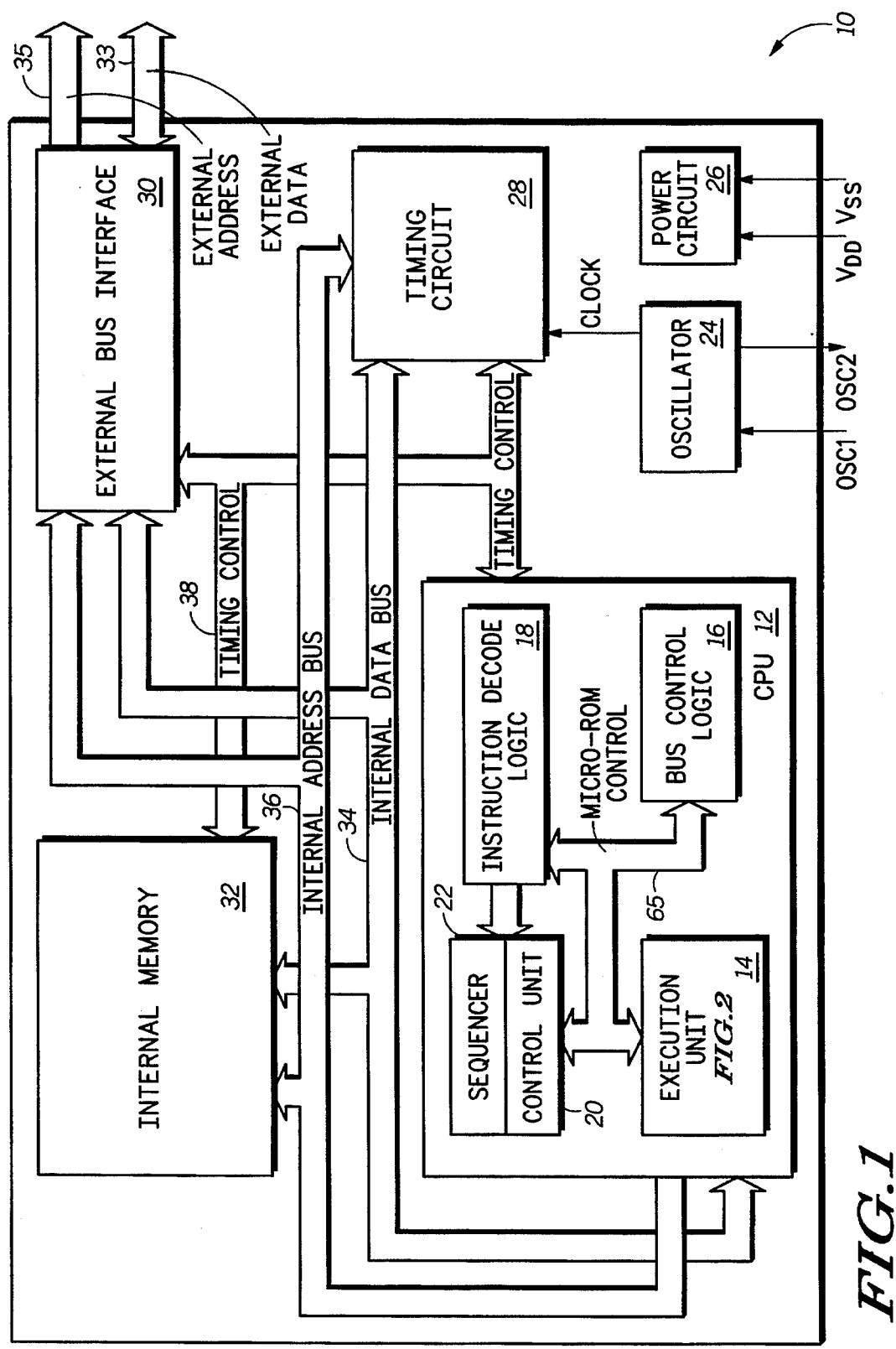
FIG. 1 illustrates in block diagram form an embodiment of a data processing system in accordance with the present invention.

One implementation of the instruction and method of operation described above is illustrated in the FIG. 1. The FIG. 1 shows a data processing system 10 in which the resumable instruction may be implemented. Data processing system 10 generally includes a central processing unit (CPU) 12, an oscillator 24, a power circuit 26, a timing circuit 28, an external bus interface 30, and an internal memory 32. CPU 12 generally has an execution unit 14, a bus control logic circuit 16, an instruction decode logic circuit 18, a control unit 20, and a sequencer 22.

During operation, an "Osc 1" signal is provided to oscillator 24 via an external source, such as a crystal. The crystal is connected between the Osc 1 and Osc 2 signals to enable the crystal to oscillate. The Osc 1 provides a "Clock" signal to a remaining portion of data processing system 10. Operation of a crystal oscillator is well known in the data processing art and should be apparent to one with ordinary skill in the art.

Similarly, power circuit 26 receives both a "Vdd" and a "Vss" signal from an external power source. The Vdd signal provides a positive 5 volts and the Vss signal provides a reference, or ground voltage. The Vdd and Vss signals are provided to each of the remaining components of data processing system 10. The routing of these signals is well known in data processing art and should be obvious to one with ordinary skill in the art.

Timing circuit 28 receives the Clock signal and subsequently provides appropriate timing signals to each of CPU 12, external bus interface 30, and internal memory 32 via a Timing Control bus 38.

A plurality of address values are provided from external bus interface 30 via an External Address bus 35. Similarly, a plurality of data values are communicated to external bus interface 30 via an External Data bus 33. External bus interface 30 functions to communicate address and data values between an external user and data processing system 10. A plurality of address and data values are communicated between external bus interface 30 and a remaining portion of data processing system 10 via an Internal Address bus 36 and an Internal Data bus 34, respectively. Internal memory 32 functions to store information values necessary for the proper operation of data processing system 10. Additionally, other data values may be stored therein if specified in a user program.

CPU 12 executes each of the instructions required during operation of data processing system 10. Internal Address bus 36 and Internal Data bus 34 communicate information between execution unit 14 and a remaining portion of data processing system 10. Bus control logic circuit 16 fetches instructions and operands. Each of the instructions is then decoded by instruction decode logic circuit 18 and provided to control unit 20 and sequencer 22. Control unit 20 and sequencer 22 maintain a sequence of execution of each of the instructions to most efficiently utilize the computing capabilities of data processing system 10. Additionally, control unit 20 includes a Micro-ROM memory (not shown) which provides a plurality of control information to each of execution unit 14, bus control logic 16, and instruction decode logic 18 via a Micro-ROM Control Bus 65.

Figure 2:
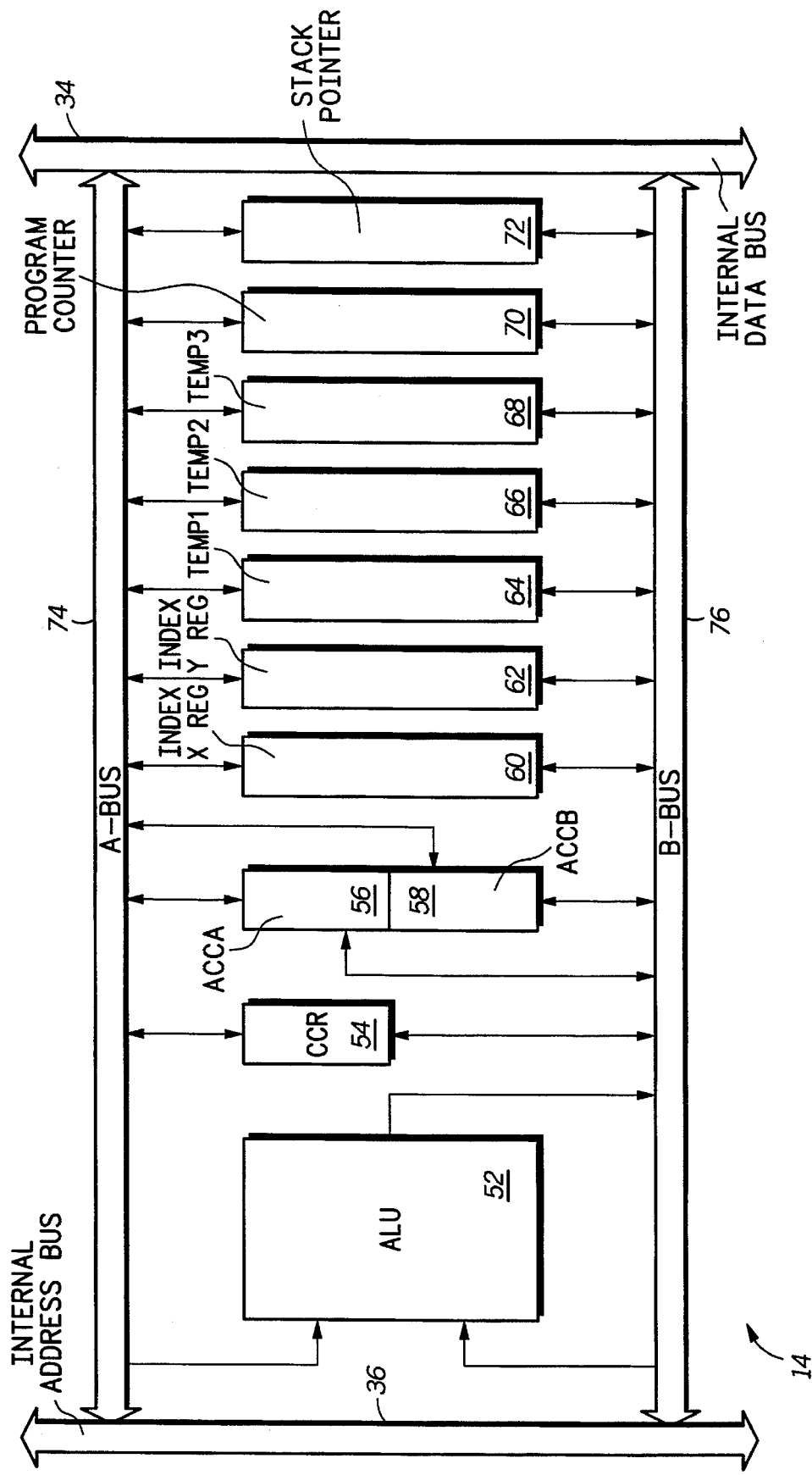
FIG. 2 illustrates in block diagram form an execution unit of the data processing system of FIG. 1.

FIG. 2 illustrates one embodiment of the execution unit 14 of data processing system 10. Execution unit 14 generally includes an arithmetic logic unit (ALU) 52, a condition code register (CCR) 54, an accumulator A (ACCA) 56, an accumulator B (ACCB) 58, an index X register 60, an index Y register 62, a first temporary register (TEMP1) 64, a second temporary register (TEMP2) 66, a third temporary register (TEMP3) 68, a program counter 70, and a stack pointer 72.

Each ALU 52, condition code register 54, accumulator A 56, accumulator B 58, index X register 60, index Y register 62, TEMP1 64, TEMP2 66, TEMP3 68, program counter 70, and stack pointer 72 is coupled to an A Bus 74 to receive data and address information. Furthermore, each of ALU 52, condition code register 54, accumulator A 56, accumulator B 58, index X register 60, index Y register 62, TEMP1 64, TEMP2 66, TEMP3 68, program counter 70, and stack pointer 72 is coupled to an B Bus 76 to provide data and address information. Both A Bus 74 and B Bus 76 are bidirectionally coupled to Internal Address Bus 36 and Internal Data Bus 34.

Description of Operation

In the present embodiment of the invention, an instruction which is used to perform weighted average operations is implemented as a resumable instruction. Assume in this case the instruction to perform the weighted average operation has a mnemonic form of "WAV" and has a two byte opcode, $18 31. The first byte of the opcode is $18 and the second byte of the opcode is $31.

When programmed, the WAV instruction executes a following equation to determine the weighted average:

$$\text{Output} = \frac{\sum_{i=1}^{B} S_i \cdot F_i}{\sum_{i=1}^{B} F_i}. \tag{1}$$

During calculation of a weighted average, a number of iterations, equal to B, in equation (1) are performed. In each of the iterations, a first value $S_i$ is multiplied by $F_i$ to form a product. A sum of the products of all B iterations is used to form a numerator of a final result. A denominator of the final result is equal to a sum of all of the $F_i$ values. The numerator is then divided by the denominator to produce a final weighted average result.

The complexity of equation (1) results in an instruction which has an inherently long execution time. If the WAV instruction was not interruptable, an interrupt would not be processed for an excessive period of time equal to approximately seven times the number of iterations, B, plus a constant value of ten. Therefore, if the number of iterations is equal to ten, eighty timing cycles are required to fully execute the WAV instruction. Such a delay would be too long to wait in servicing an interrupt.

Furthermore, because of the length of the WAV instruction, there is a high possibility that an interrupt will occur sometime during execution of the weighted average operation. If, as is provided in prior art implementations, the interrupt is processed immediately and the instruction is reinitialized and executed again, the processing time already used to partially perform the WAV instruction is effectively wasted. The WAV instruction must be executed from the beginning and previously processed iterations of the weighted average function must be executed again.

However, in the present invention, the WAV instruction may be interrupted while in the process of executing the weighted average operation and may then be resumed from the point at which it was interrupted at a later point in time.

As was previously mentioned, the data processing system described herein implements the WAV instruction using two instruction bytes, $18 31. When a program counter points to $18, the first instruction byte is accessed and used to enable the data processing system to execute the WAV instruction. If no interrupt occurs, the WAV operation is fully executed. However, if an interrupt occurs during execution of the data processing operation, intermediate data calculated as a result of the WAV operation is stored in the stack memory. Additionally, the program counter is incremented by one to access the second byte of the instruction, $31.

Subsequently, the data processing system executes an interrupt routine. After executing the interrupt routine, the incremented program counter points to the second instruction byte of the instruction to resume execution of the WAV instruction. When the second byte of the WAV instruction is accessed, a resume portion of the instruction is executed in which the intermediate results of the data processing operation are accessed from the stack memory and restored to their respective storage locations within the data processing system. As well, the program counter is decremented by one such that it points to the first byte of the instruction. After the intermediate results are restored, the WAV instruction continues executing the data processing operation as though no interrupt occurred.

The data processing system described herein allows a user of the processing system to interrupt the WAV instruction, execute an interrupt routine, and then complete execution of the WAV instruction with no lost cycle time. Unlike prior art implementations, the user is not required to wait until the instruction is fully executed to execute the interrupt routine in response to an interrupt signal. As well, the user does not lose intermediate results.

A more detailed description of execution of the WAV instruction in the present embodiment of the invention will now be provided. Assume, during the following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, it should be noted that the inclusion of a "$" before a value indicates the value is a hexadecimal number.

During operation of the data processing system illustrated in FIG. 1, a number of operations must occur before the WAV instruction is executed. Each of the $S_i$ and $F_i$ values used in equation (1) must be stored in a memory location such as internal memory 32. Additionally, an address value of a memory location storing a first one of the plurality of $S_i$ values is stored in index X register 60. An address value of a memory location storing a first one of the plurality of $F_i$ values is stored in index Y register 62. Furthermore, a user of data processing system 10 must specify a number of iterations, B, of the weighted average operation to be executed. The number of iterations is typically stored in accumulator B 58 before execution of the WAV instruction. As the operations of storing a value in memory, storing a value in an index register, and storing a value in an accumulator are well known in the data processing art, the operations will not be explained in further detail herein.

After each of the $S_i$ and $F_i$ values are stored in internal memory 32, and the appropriate starting address values are stored in index X register 60 and index Y register 62, the WAV instruction may be provided by a user of data processing system 10. The WAV instruction is generally part of a program which may be stored in internal memory 32 or provided by an external source through external bus interface 30.

If the WAV instruction is stored in internal memory 32, an opcode representation of the WAV instruction is transferred to CPU 12 via Internal Data bus 34. In this embodiment of the invention, the opcode representation is equal to $18.31. Execution unit 14 passes the WAV instruction to instruction decode logic 18 via the Micro-ROM Control bus 65 where it is decoded to provide a plurality of control signals for controlling execution of the weighted average operation in execution unit 14.

Similarly, if the WAV instruction is provided by the external source, external bus interface 30 provides the opcode representation of the WAV instruction to CPU 12 via Internal Data bus 34. Execution unit 14 again passes the WAV instruction to instruction decode logic 18 via the Micro-ROM Control bus 65 where it is decoded to provide the plurality of control signals necessary to control execution of the weighted average operation.

Upon initiation of the WAV instruction, program counter 72 holds the address of a hexadecimal value of $18, the first byte of the WAV instruction. A first step in execution of the WAV instruction requires that each of TEMP1 64, TEMP2 66, and TEMP3 68 is cleared. Subsequently, the contents of accumulator B 58, the number of iterations of the weighted average calculation needed by the user, are decremented by a value of one and the decremented value is again stored in accumulator B 58. It should be noted that when the contents of accumulator B 58 are equal to zero, a Z-bit in condition code register 54 is asserted to indicate that a last iteration in the weighted average operation is currently occurring. The numerator and denominator must still be divided, however, to fully complete the weighted average operation.

If the contents of accumulator B 58 are not equal to zero, index X register 60 provides a first address stored therein to B Bus 76. B Bus 76 transfers the first address to internal memory 32 via Internal Address bus 36. The first address accesses a memory location of a first $S_i$ value stored in internal memory 32. Subsequently, internal memory 32 provides the $S_i$ value to a first input of ALU 52 via both Internal Data bus 34 and A Bus 74.

Similarly, index Y register 62 provides a second address stored therein to B Bus 76. B Bus 76 transfers the second address to internal memory 32 via Internal Address bus 36. The second address accesses a memory location of a first $F_i$ value stored in internal memory 32. Subsequently, internal memory 32 provides the $F_i$ value to a second input of ALU 52 via both Internal Data bus 34 and B Bus 76. The $F_i$ value is also added to the value stored in TEMP1 64 for later use. In this embodiment of the invention, TEMP1 64 is a sixteen bit register which is used to store the denominator of equation (1).

ALU 52 multiplies the first $S_i$ and the first $F_i$ values to provide a first product. The first product is subsequently added to and stored in TEMP2 66 and TEMP3 68 for later user. In this embodiment of the invention, each of TEMP2 66 and TEMP3 68 is a sixteen bit register which is used to store a portion of the numerator of equation (1). TEMP2 66 and TEMP3 68 are concatenated to form a thirty-two bit register for storing the numerator.

After the product is formed and stored in TEMP2 66 and TEMP3 68 and the first $F_i$ value is stored in TEMP1 64, the addresses stored in each of index X register 60 and index Y register 62 are incremented by one.

Subsequently, the weighted average operation continues execution. The contents of accumulator B 58 are decremented by one and the Z-bit of condition code register 54 is again tested to determine if the number of iterations of the weighted average calculation required by the user of data processing system 10 have been performed. If the Z bit is asserted, one more multiply and accumulate iteration is performed. After the last multiply and accumulate iteration is performed, the numerator stored in TEMP2 66 and TEMP3 68 is divided by the denominator stored in TEMP1 64 to produce a final weighted average value.

Each time B accumulator 58 is decremented, CPU 12 tests to determine if an interrupt signal has been asserted in data processing system 10. If no interrupt signal has been asserted, Index X register 60 provides a first incremented address to internal memory 32 via B bus 76 and Internal Address bus 36. The incremented address accesses a memory location of a next $S_{i+1}$ value stored in internal memory 32. Internal memory 32 provides the $S_{i+1}$ value to a first input of ALU 52 via both Internal Data bus 34 and A Bus 74.

Similarly, index Y register 62 provides a second incremented address stored therein to internal memory 32 via B bus 76 and Internal Address bus 36. The second address accesses a memory location of a next $F_{i+1}$ value stored in internal memory 32. Subsequently, internal memory 32 provides the $F_{i+1}$ value to a second input of ALU 52 via both Internal Data bus 34 and B Bus 76.

ALU 52 multiplies the $S_{i+1}$ and the $F_{i+1}$ values to provide a next product. The contents of TEMP2 66 and TEMP3 68 are provided to ALU 52 via A Bus 74. ALU 52 then sums the current contents of TEMP2 66 and TEMP3 68 with the product of $S_{i+1}$ and the $F_{i+1}$. The numerator formed as a result of this iterative calculation is transferred to and stored in TEMP2 66 and TEMP3 68 for later user.

Next, the contents of TEMP1 64 are summed with the $F_{i+1}$ value. The denominator formed as a result of this summation is transferred and stored in TEMP1 64 for later use. After the numerator is formed and stored in TEMP2 66 and TEMP3 68 and the denominator is stored in TEMP1 64, the addresses stored in each of index X register 60 and index Y register 62 are again incremented by one. The multiply and accumulate operations described herein are iteratively performed until the Z-bit is set or until an interrupt signal is pending.

When the interrupt signal is pending, the values stored in each of TEMP1 64, TEMP2 66, and TEMP3 68 are stored at an address in internal memory 32 pointed to by a stack pointer value stored in stack pointer register 72. The stack pointer value is decremented and the denominator stored in TEMP1 64 is stored at the memory location pointed to by the stack pointer value. The stack pointer value is then decremented to point to a next memory location at which a first portion of the numerator stored in TEMP2 66 is stored. Again, the stack pointer value is decremented and the second portion of the numerator stored in TEMP3 68 is stored at the memory location pointed to by the decremented stack pointer value. The program counter is then incremented by one to point at $31, rather than $18. In addition to the contents of TEMP1 64, TEMP2 66, and TEMP3 68, the contents of program counter 70, index Y register 62, index X register 60, accumulator A 56, accumulator B 58, and condition code register 54 are also stored in internal memory 32 at locations indicated by the stack pointer value.

The interrupt signal is then acknowledged and serviced in accordance with an appropriate interrupt routine. Such interrupt servicing is well known in the data processing art and will not be described in more detail herein.

When the program counter points to $31, a resumable WAV instruction referred to as WAVR is accessed. The WAVR instruction allows a user to resume operation of the WAV instruction as though no interrupt had occurred. When the WAVR instruction is accessed, execution unit 14 passes the WAV instruction to instruction decode logic 18 via the Micro-ROM Control bus 65. Decode logic 18 decodes the WAVR instruction to provide a plurality of control signals for controlling execution of the resumable weighted average operation in execution unit 14.

The contents of each of condition code register 54, accumulator B 58, accumulator A 56, index X register 60, index Y register 62, and program counter 70 are also retrieved from internal memory 32 and stored at a respective register in execution unit 14. The stack pointer is used to access the second portion of the numerator from internal memory 32. The second portion of the numerator is transferred via Internal Data bus 34 and A bus 74 to be stored in TEMP3 68. The stack pointer is then incremented to access the first portion of the numerator from internal memory 32. The first portion of the numerator is transferred via Internal Data bus 34 and A bus 74 to be stored in TEMP2 66. Again, the stack pointer is incremented to access the denominator from internal memory 32. The denominator is transferred by Internal Data bus 34 and A bus 74 to be stored in TEMP1 64.

In addition to restoring the contents of the registers to an intermediate state in execution of the WAV instruction, the WAVR instruction also decrements the program counter value by one such that it is again pointing at the first byte of the WAV instruction, $18. Therefore, if the weighted average operation is interrupted again, the save and resumption operations described herein will be executed correctly.

After the registers are restored and the program counter is incremented, execution of the WAV instruction continues as though the interrupt had not occurred. The operands are accessed from the locations in internal memory 32 pointed to by index X register 60 and index Y register 62 and iteratively used to perform the multiply and accumulation operations necessary to perform the weighted average operation. As was previously mentioned, the multiply and accumulate iterations are performed until the Z-bit in the condition code register is asserted. At that point, one more multiply and accumulate iteration is performed and the numerator is divided by the denominator to produce the weighted average value.

Figure 3:
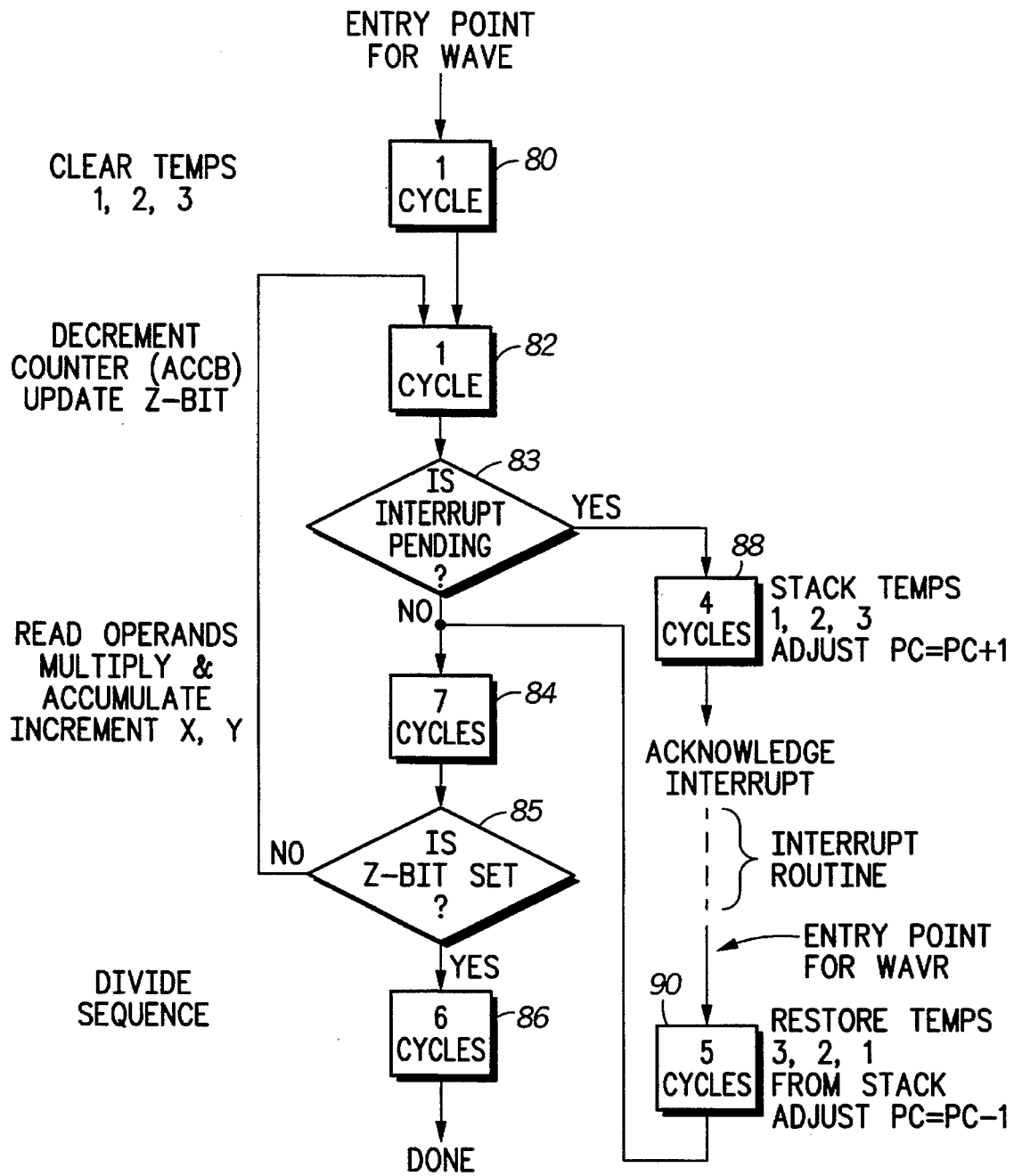
FIG. 3 illustrates in flow chart form, an execution flow for a resumable instruction in the data processing system of FIG. 1.

The operation previously described is summarized in the flow chart illustrated in FIG. 3. It should be noted that the numbers in each of boxes 80 through 90 indicate a number of timing cycles required to perform each section of the weighted average operation.

In FIG. 3, box 80 is an entry point for the WAV instruction. At that point, the contents of each of TEMP1 64, TEMP2 66, and TEMP3 68 is cleared in one timing cycle. In box 82, the contents of accumulator B 58 are decremented and the Z-bit in condition code register 54 is updated. These steps require one timing cycle.

In box 83, CPU 12 tests to determine if an interrupt is pending. If no interrupt is pending, execution of the WAV instruction continues with the steps of reading the operands from memory, multiplying the operands, and accumulating the operands as the numerator and the denominator as represented by box 84. The index registers are also incremented to access a next operand from memory. The steps described in box 84 require seven timing cycles to perform.

In box 85, the Z-bit in condition code register 54 is tested. If the Z-bit is not set, then the flow of execution of the WAV instruction circulates between box 82 and box 84 until all iterations have been performed.

Box 86 indicates a last step in the execution of the WAV instruction. If the Z-bit in condition code register 54 is set, the numerator and denominator calculated as a result of all of the iterations of multiply and accumulate operations are divided in a process which requires six timing cycles.

If, however, CPU 12 had found that an interrupt was pending after execution of the steps in box 82, box 88 would have been subsequently accessed. In box 88, each of TEMP1 64, TEMP2 66, and TEMP3 68 are stacked in internal memory 32 at a location specified by the stack pointer stored in stack pointer register 72. The steps of storing the contents of TEMP3 68, TEMP2 66, and TEMP1 64 require 4 timing cycles.

Next, the interrupt signal is acknowledged and an interrupt routine is executed. After execution of the interrupt routine, the WAVR instruction is accessed to resume execution of the WAV instruction. As shown in box 90, the contents of each of TEMP1 64, TEMP2 66, and TEMP3 68 are restored to their values before being interrupted and the program counter is decremented by one.

As the flow diagram in FIG. 3 illustrates, the WAV instruction may be interrupted and resumed more than one time. The program counter is restored to point at the first byte of the WAV opcode ($18) after execution of the WAVR is performed. Therefore, if an interrupt occurs and the WAVR instruction ($31) is accessed, the program counter is restored to point at a value of $18 after the interrupt has been serviced and before beginning any multiply and accumulate iterations. Therefore, if another interrupt is asserted, the WAVR instruction is again able to be accessed.

SUMMARY OF OPERATION

The data processing system described herein implements an instruction using two instruction bytes. When a program counter points to an address of the instruction in memory, a first instruction byte is accessed and used to enable the data processing system to execute a certain data processing operation. If no interrupt occurs, the data processing operation is fully executed. However, if an interrupt occurs during execution of the data processing operation, intermediate data calculated as a result of the data processing operation and held in a plurality of temporary registers, is saved in the stack memory at a location pointed to by the value stored in stack pointer register 72. Additionally, the program counter is incremented by one so that it points to a second byte of the instruction.

Subsequently, the data processing system executes an interrupt routine. After executing the interrupt routine, the incremented program counter points to the second instruction byte of the instruction to resume instruction execution. When the second byte of the instruction is accessed, a resume portion of the instruction is executed in which the intermediate results of the data processing operation are accessed from the stack memory and restored to their respective storage locations within the data processing system. As well, the program counter is decremented by one such that it points to the first byte of the instruction. After the intermediate results are restored, the instruction continues executing the data processing operation as though no interrupt occurred.

The data processing system described herein allows a user of the processing system to interrupt an instruction, execute an interrupt routine, and then to complete execution of the instruction with no lost cycle time. Unlike prior art implementations, the user is not required to wait until the instruction is fully executed to execute the interrupt routine in response to an interrupt signal. As well, the user does not lose intermediate results The implementation of the invention described herein is provided by way of example only. However, many other implementations may exist for executing the function described herein. For example, the embodiment of the invention is not limited to the WAV, or weighted average instruction. Many other instructions could also be implemented using a two byte instruction encoding which allowed for resumption of instruction execution after an interruption. In general, this invention would be most useful in instructions which have a long execution time and in which initialization requires a significant number of timing cycles.

In addition to applying the concepts described herein to other instructions, the embodiment described herein may also use different circuitry in implementing data processing system 10 and execution unit 14. Furthermore, it should be understood that the resumable instruction described herein may be longer than two bytes. Multiple bytes could be used to provide multiple inputs to instruction execution.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for executing a resumable instruction in a data processor, comprising the steps of i) initializing a plurality of temporary registers to a first predetermined value;

ii) storing an iteration value in a first accumulator;

iii) storing a pointer to a first operand in a first index register and storing a pointer to a second operand in a second index register;

iv) receiving a resumable instruction having a first instruction byte and a second instruction byte;

v) enabling a program counter to point to the first instruction byte;

vi) decrementing the iteration value in the first accumulator;

vii) providing the first operand and the second operand to an arithmetic logic unit;

viii) enabling the arithmetic logic unit to multiply the first operand and the second operand to generate a product;

ix) adding the product to a first intermediate value stored in a first portion of the plurality of temporary registers;

x) adding the first operand to a second intermediate value stored in a second portion of the plurality of temporary registers;

xi) testing to determine if the iteration value stored in the first accumulator is equal to a second predetermined value;

xii) repeating each of steps iv) through ix) if the iteration value stored in the first accumulator is not equal to the second predetermined value;

xiii) interrupting execution of step iv) through step ix) to execute step xiv) through xix) when an interrupt signal is asserted;

xiv) incrementing the program counter to point to the second instruction byte when the interrupt signal is asserted;

xv) storing the first intermediate value and the second intermediate value in a stack memory;

xvi) executing an interrupt routine in response to the interrupt signal;

xvii) retrieving the first intermediate value and the second intermediate value from the stack memory when the program counter points to the second instruction byte;

xviii) decrementing the program counter to point to the first instruction byte; and xix) continuing execution of the resumable instruction in the data processor.

2. The method of claim 1 further comprising the step of:
dividing the first intermediate value by the second intermediate value to produce a weighted average output when the iteration value stored in the first accumulator is equal to the second predetermined value.

3. The method of claim 1 further comprising the step of:
xx) decrementing the program counter by a predetermined value to point to the first instruction byte when the second data processing function is executed completely.

4. The method of claim 3 further comprising the step of returning to step vii) after step xx) is executed.

5. A method for executing a resumable instruction in a data processor, comprising the steps of receiving a resumable instruction having a first instruction byte and a second instruction byte;

enabling a program counter to point to the first instruction byte to execute the resumable instruction;

enabling the program counter to point to the second instruction byte when an interrupt signal is asserted;

executing a first data processing function when the program counter points to the first instruction byte, wherein the first data processing function comprises the steps of:

i) initializing a plurality of temporary registers to a first predetermined value;

ii) storing an iteration value in a first accumulator;

iii) storing a pointer to a first operand in a first index register and storing a pointer to a second operand in a second index register;

iv) decrementing the iteration value in the first accumulator;

v) providing the first operand and the second operand to an arithmetic logic unit;

vi) enabling the arithmetic logic unit to multiply the first operand and the second operand to generate a product;

vii) adding the product to a first intermediate value stored in a first portion of the plurality of temporary registers;

viii) adding the first operand to a second intermediate value stored in a second portion of the plurality of temporary registers;

ix) testing to determine if the iteration value stored in the first accumulator is equal to a second predetermined value;

x) repeating each of steps iv) through ix) if the iteration value stored in the first accumulator is not equal to the second predetermined value; and xi) dividing the first intermediate value by the second intermediate value to produce a weighted average output; and executing a second data processing function when the program counter points to the second instruction byte, wherein the second data processing function enables the data processor to execute an interrupt operation and to return to an intermediate state after execution of the interrupt operation to resume execution of the first data processing function.

6. The method of claim 5 further comprising the steps of:
determining if an interrupt signal is asserted;

incrementing the program counter to point to the second instruction byte when the interrupt signal is asserted;

storing the first intermediate value and the second intermediate value in a stack memory; and executing an interrupt routine in response to the interrupt signal.

7. The method of claim 6 wherein the second data processing function comprises the steps of:

retrieving the first intermediate value and the second intermediate value from the stack memory;

storing the first intermediate value in the first portion of the plurality of temporary registers; and storing the second intermediate value in the second portion of the plurality of temporary registers.

8. The method of claim 7 further comprising the step of:
decrementing the program counter to point to the first instruction byte when the second data processing function is completely executed.

9. A data processing system, comprising:

interface means for receiving a resumable instruction, the resumable instruction having a first instruction byte and a second instruction byte;

instruction decode means for decoding the resumable instruction to provide a plurality of control values, the instruction decode means being coupled to the interface means for receiving the resumable instruction;

a program counter for storing a program counter value pointing to the resumable instruction, the program counter pointing to the first instruction byte of the resumable instruction and the program counter pointing to the second instruction byte of the resumable instruction after an interrupt signal is asserted;

register means for storing a plurality of initialization values and a plurality of intermediate values calculated when the program counter value points to the first instruction byte of the resumable instruction;

an arithmetic logic unit coupled to the register means for receiving the plurality of initialization values and the plurality of intermediate values, the arithmetic logic unit selectively using the plurality of initialization values and the plurality of intermediate values to calculate a result of the resumable instruction in response to the plurality of control values; and a stack memory for storing the plurality of intermediate values stored in the register means when the interrupt signal is asserted and the program counter value points to the first instruction byte of the resumable instruction, the stack memory providing the plurality of intermediate values to the register means when the program counter value points to the second instruction byte of the resumable instruction.

10. The data processing system of claim 9 wherein the resumable instruction is a weighted average instruction for performing a weighted average operation.

11. The data processing system of claim 9 wherein the program counter value is decremented to point to the first instruction byte of the resumable instruction after the plurality of intermediate values are retrieved from the stack memory and stored in the register means.

12. A method for executing a resumable instruction in a data processor, comprising the steps of receiving a resumable instruction having a first instruction byte and a second instruction byte;

enabling a program counter to point to the first instruction byte to execute the resumable instruction;

enabling the program counter to point to the second instruction byte when an interrupt signal is asserted;

executing a first data processing function when the program counter points to the first instruction byte; and executing a second data processing function when the program counter points to the second instruction byte, wherein the second data processing function enables the data processor to execute an interrupt operation and to return to an intermediate state after execution of the interrupt operation to resume execution of the first data processing function.

13. The method of claim 12 further comprising the steps of:

receiving an interrupt signal during execution of the first data processing function;

incrementing the program counter by a predetermined value to point to the second instruction byte when the interrupt signal is asserted.

14. The method of claim 12 further comprising the steps of:

decrementing the program counter by a predetermined value to point to the first instruction byte when the second data processing function is executed completely.

15. The method of claim 12 wherein the first data processing function is a weighted average operation which performs an iterative calculation of a form:

$$\frac{\sum_{i=1}^{n} S_i \cdot F_i}{\sum_{i=1}^{n} F_i}$$

where S is a first data characteristic and F is a second data characteristic.

16. The method of claim 12 wherein the first data processing function comprises the steps of:

i) initializing a plurality of temporary registers to a first predetermined value;

ii) storing an iteration value in a first accumulator;

iii) storing a pointer to a first operand in a first index register and storing a pointer to a second operand in a second index register;

iv) decrementing the iteration value in the first accumulator;

v) providing the first operand and the second operand to an arithmetic logic unit;

vi) enabling the arithmetic logic unit to multiply the first operand and the second operand to generate a product;

vii) adding the product to a first intermediate value stored in a first portion of the plurality of temporary registers;

viii) adding the first operand to a second intermediate value stored in a second portion of the plurality of temporary registers;

ix) testing to determine if the iteration value stored in the first accumulator is equal to a second predetermined value;

x) repeating each of steps iv) through ix) if the iteration value stored in the first accumulator is not equal to the second predetermined value; and xi) dividing the first intermediate value by the second intermediate value to produce a weighted average output.

17. The method of claim 16 wherein the second predetermined value is equal to zero.

18. The method of claim 12 further comprising the steps of:

determining if an interrupt signal is asserted;

incrementing the program counter to point to the second instruction byte when the interrupt signal is asserted;

storing the first intermediate value and the second intermediate value in a stack memory; and executing an interrupt routine in response to the interrupt signal.

19. The method of claim 18 wherein the second data processing function comprises the steps of:

retrieving the first intermediate value and the second intermediate value from the stack memory;

storing the first intermediate value in the first portion of the plurality of temporary registers; and storing the second intermediate value in the second portion of the plurality of temporary registers.

20. The method of claim 19 further comprising the step of:

decrementing the program counter to point to the first instruction byte when the second data processing function is completely executed.

* * * * *